United States Patent [19]

DeCampos et al.

[11] Patent Number: 5,388,471
[45] Date of Patent: Feb. 14, 1995

[54] THRUST BEARING FOR AN ACTUATOR DRIVING A SENSOR DEVICE

[75] Inventors: Hugo N. DeCampos, Granger; Jason G. Maalouf, South Bend, both of Ind.

[73] Assignee: AlliedSignal Inc., Morristown, N.J.

[21] Appl. No.: 134,725

[22] Filed: Oct. 12, 1993

[51] Int. Cl.[6] ............................................. F16H 25/20
[52] U.S. Cl. ............................ 74/89.15; 74/424.8 R
[58] Field of Search .................. 74/89.15, 424.8 R; 192/141

[56] References Cited

U.S. PATENT DOCUMENTS

| | | | |
|---|---|---|---|
| 2,660,281 | 11/1953 | Ochtman | 192/141 |
| 4,249,453 | 2/1981 | Riggs et al. | 91/59 |
| 4,442,928 | 4/1984 | Eastman | 192/141 X |
| 4,635,491 | 1/1987 | Yamano et al. | 74/89.15 |
| 4,729,544 | 3/1988 | Baumann | 74/89.15 X |
| 5,041,748 | 8/1991 | Huber | 74/89.15 X |

*Primary Examiner*—Allan D. Herrmann
*Attorney, Agent, or Firm*—Leo H. McCormick, Jr.; Larry J. Palguta

[57] ABSTRACT

A thrust bearing assembly for retaining a ball screw of an actuator in a housing and driving a position sensor in a control system. The thrust bearing assembly has a cylindrical body with an annular radial projection having parallel first and second inner outer race surfaces. Gear teeth are located on the peripheral surface of the radial projection. First and second roller bearing and associated first and second outer races are located on said cylindrical body. A locating plate attached the housing urges the second outer race toward the housing to bring the second roller bearing into engagement with the second inner race and the first inner race into engagement with the first roller bearing and first outer race to fix the position of the ball screw in the housing. The ball screw is connected to receive rotary torque from a drive gear to position a translating ball nut within the housing. Rotation of the ball screw correspondingly rotates the cylindrical body such that the gear teeth on the peripheral surface provides a sensor with a signal indicative of the location of the ball nut within the housing.

7 Claims, 2 Drawing Sheets

THRUST BEARING FOR AN ACTUATOR DRIVING A SENSOR DEVICE

This invention relates to a thrust bearing assembly for retaining a ball screw in a bore of a housing and driving a sensor device. The thrust bearing has a cylindrical body which is connected to a ball screw. The cylindrical body has a projection with gear teeth thereon which provides the sensor device with information relating to the position of a ball screw and associated output member with respect to the housing.

The system illustrated in U.S. Pat. No. 4,442,928 is an example of a ball screw actuator which receives an input torque from a power source to provide a force for moving a member to position a device such as a flap or nozzle associated with an aircraft. In such a system, it is common for the actuator to be positioned anywhere between a fully extended or retracted position with positioning and time response to movement from one position to the other being of primary importance. Recently, it has been suggested that improved operation of devices could be better achieved by providing direct positioning for the ball screw. Further, in an effort to reduce the weight while at the same time improving the efficiency of an aircraft it was suggested than the current practice of using five actuators to position a convergent nozzle area device on an engine could be reduced to three while incorporating vectoring to improve maneuverability. The use of vectoring information is of importance since the exact position of the nozzle area effects the operation of the aircraft. Thus, the instantaneous position of a ball screw and correspondingly the output member with respect to the housing of the actuator needs to be accurately communicated to a controller to assure than the convergent nozzle area corresponds with a desired operational position as defined by the controller to define the most effective operation of an aircraft with respect to current operational conditions. To assure conformity between actual and optimum system operation, some current systems have a first feedback signal located within the source of power, typically an airmotor such as disclosed in U.S. Pat. No. 4,249,453 and a second feedback signal servo section are matched to define the position of the output member. Unfortunately, airmotor works against the system load and as a result a lag occurs between the two feedback systems defining the actual and indicated actuator position. It was suggested that a separate position indicator could be independently and directly connected to the drive member of the ball screw but this was rejected because of additional size and weight of the gearing which would be placed on the gear box of the actuator. In addition, the space in which to locate a feedback member with respect to the drive member is very limited and as a result other alternative were required to be explored to meet a customer requirement.

The present invention provides solutions to the above problems relating to space, weight and time response by obtaining information relating to the current position of an output member of an actuator from a signal of a sensor which is derived from the rotation of a thrust bearing assembly which retains the ball screw in the housing of an actuator. The thrust bearing assembly being comprised of a cylindrical body with an axial bore that extends from a first end and a second end. An annular radial projection that extends from the cylindrical body having gear teeth located on a peripheral surface and first and second inner race surfaces thereon adjacent said first and second ends, respectively. First and second roller bearings are located on the cylindrical body and positioned to engage the first and second inner race surfaces. First and second plates located in the housing form first and second outer race surface for the first and second roller bearings. A locating plate attached to the housing engages the second plate to urge the first and second roller bearings into engagement with the first and second inner and outer race surfaces to fix the position of the cylindrical body and ball screw in the housing. In response to rotative movement applied to the ball screw, the gear teeth on the peripheral surface of the cylindrical body provides a sensor with an input corresponding to the location of the output member with respect to the housing. Thus, the thrust bearing assembly in addition to holding the ball screw in axial alignment in the housing also provides an input to develop instantaneous signal through a sensor device to the computer corresponding to the position of a ball nut and correspondingly the output member which is positioning the convergent nozzle for the engine.

An advantage of the present actuator occurs since the thrust bearing assembly in addition to axially locating a ball screw also radially positions the ball screw to assure that gear teeth on an inner race are aligned with a sensor to indicate the position of a ball nut with respect to the housing of the actuator.

Further, the structure from which a feedback signal is derived by a sensor does not significantly add to the over all weight and size of the actuator while at the same time providing an instantaneous indication of the location of an output member in a system where weight and space are a premium.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
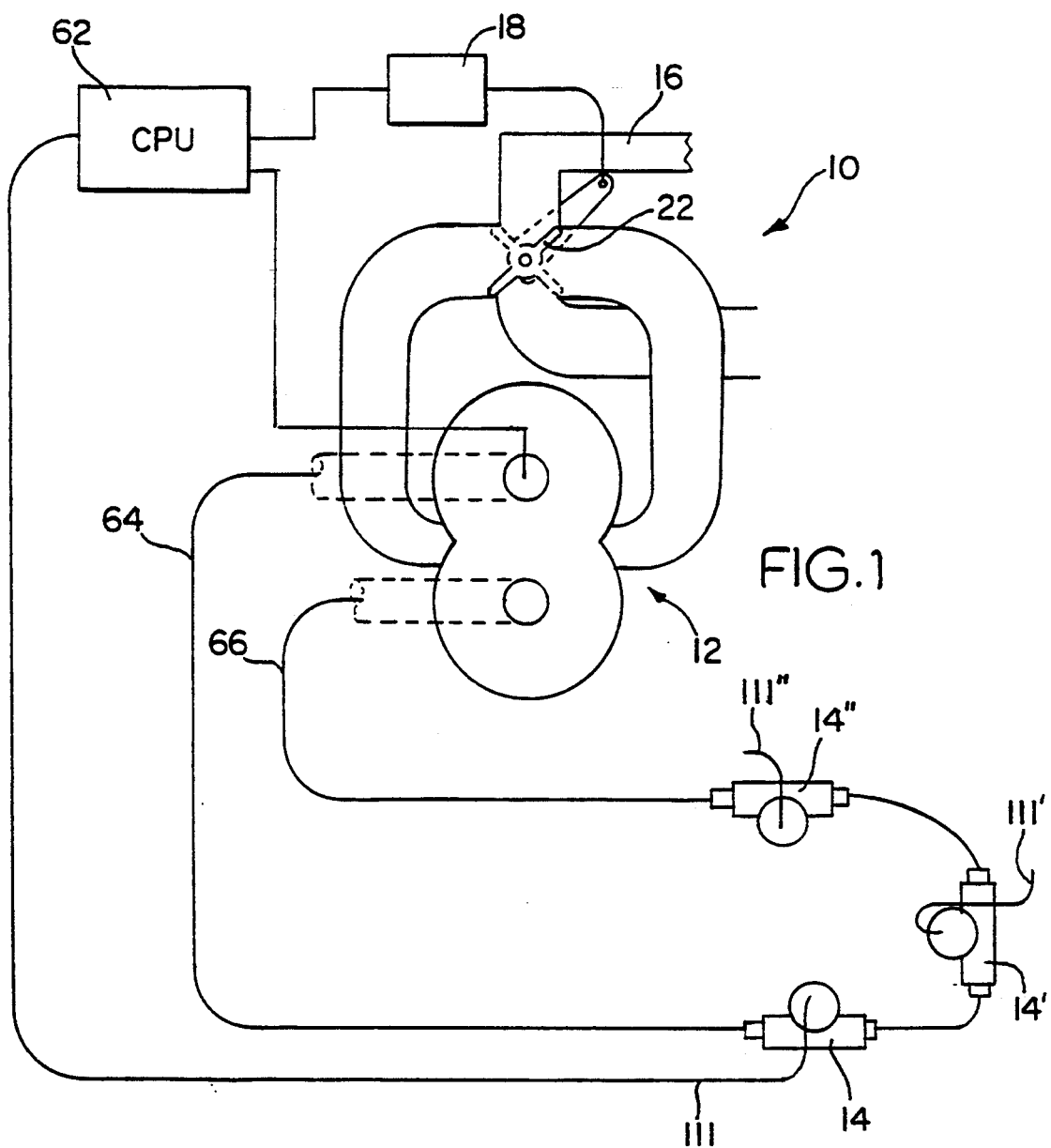
FIG. 1 is a schematic illustration of a control system with ball screw actuators made according to the principals of this invention to provide a feedback signal corresponding to the instantaneous position of an output members.

The control system 10 shown in FIG. 1 includes an airmotor 12 of the type disclosed in U.S. Pat. No. 4,249,453 which supplies multiple ball screw actuators 14,14' and 14" with an input to develop an output to control a convergent nozzle of a turbine.

When a turbine is operating, compressor discharge pressurized air is available in conduit 16 to provide a source of power for airmotor 12. The operation of the airmotor 12 is controlled by a four way selector valve 22. The four way selector valve 22 receives an input from a direct hydromechanical servo assembly 18, as disclosed in U.S. Pat. No. 4,249,453, which is responsive to a power assembly and a feedback signal which represents the work being performed by the motor elements. The output from the motor elements is carried on cables 64 and 66 connected to actuators 14, 14' and 14". Actuators 14,14' and 14" and the hydromechanical servo assembly 18 are connected to a cpu 62 associated with the operation of the turbine.

The output from airmotor 12 as carried on cables 64 and 66 positions the ball screw actuators 14,14' and 14" to position the convergent nozzle of the turbine. Each of the ball screw actuator 14, 14' and 14" are identical and only ball screw actuator 14 is shown in detail in FIGS. 2, 3 4 and 5.

Ball screw actuator 14 has a housing 86 with a bore 88 therein. Guide rails 90 and 92 which are attached to housing 86 in bore 88 receive slots 94 and 96 in supports on ball nut 98 retained on ball screw 108. The ball screw 108 is retained by a thrust bearing assembly 110 which is fixed to housing 86 while the housing 86 is fixed to the body of the turbine by flange clamp member 100. All movement of ball nut 98 within bore 88 is communicated though an inner tube or output member 102 that extends through sealed opening 104 to provides linkage 106 connected to the convergent nozzle with a force to change its position during the operation of the turbine. A resistance variable distance transformer 112 attached to housing 86 receives an input signal from the thrust bearing assembly 110 corresponding to the rotation of the ball screw 108 to provide cpu 62 with an instantaneous signal on line 111 such that the configuration of the convergent nozzle is known and inputted into the current operational parameters of the turbine and aircraft.

The thrust bearing assembly 110 has a cylindrical body 114 with an axial bore 116 that extends from a first end 118 to a second end 120. The cylindrical body 114 has an annular radial projection 122 with gear teeth 124 on a peripheral surface 126 and first 128 and second 130 inner race surfaces thereon that are parallel to each other and perpendicular to the axial bore 116. The cylindrical body 114 has splines 115 in the axial bore 116 that are mated with corresponding splines 109 on the ball screw 108 and a tapered or ramped surface 132 that extends from the first end 118 into the axial bore 116 such that cylindrical body 114 and ball screw 108 form a unitary structure after end nut 134 is attached to the first end 118. A washer member 136 associated with nut 134 includes a semi circular ring 138 located in groove 140 on ball screw 108 and a ramped ring 142 located on the ball screw 108. When end nut 134 is screwed onto first end 118 the tapered or ramped surfaces on ring 142 of washer member 136 move into engagement with ramped or tapered surface 132 on the cylindrical body 114 to develop frictional clamping therebetween and thereby fix the cylindrical body 114 to the ball screw 108.

A first plate 144 is located against shoulder 146 in bore 48 of housing 40. Housing 40 is welded to housing 86 to form a unitary structure. The first plate 144 defines an outer race surface 148 for a first roller bearing 150 located on cylindrical body 114 and positioned to engage the inner race surface 128.

A second plate 152 is located in bore 48 of housing 40 to define an outer race surface 154 for a second roller bearing 156 located on the cylindrical body 114 and positioned to engage inner race surface 130.

A locating plate 159, engages the second plate 152 to urge the first 150 and second 156 roller bearings into engagement with the first and second inner 128,130 and outer 148,154 race surfaces to axially fix the position of cylindrical body 114 in housing 40.

Sensor or resistive variable distance transformer 112' has a gear 158 which is directly connected to gear teeth 124 on the peripheral surface 126 of cylindrical body 114. Spacer members 160, 160',see FIG. 2, in the form of flat plates can be located between housing 86 and housing 113 of sensor 112 to assure that the gear teeth 124 mesh with gear 158. Rotation of gear 158 is converted by the sensor 112 into a signal which is communicated on line 111 to cpu 62 to provide an indication of the position of the output tube or member 102 with respect to the housing 86 and correspondingly the configuration of the convergent nozzle in response to a rotative input from cables 64 and 66.

Figure 2:
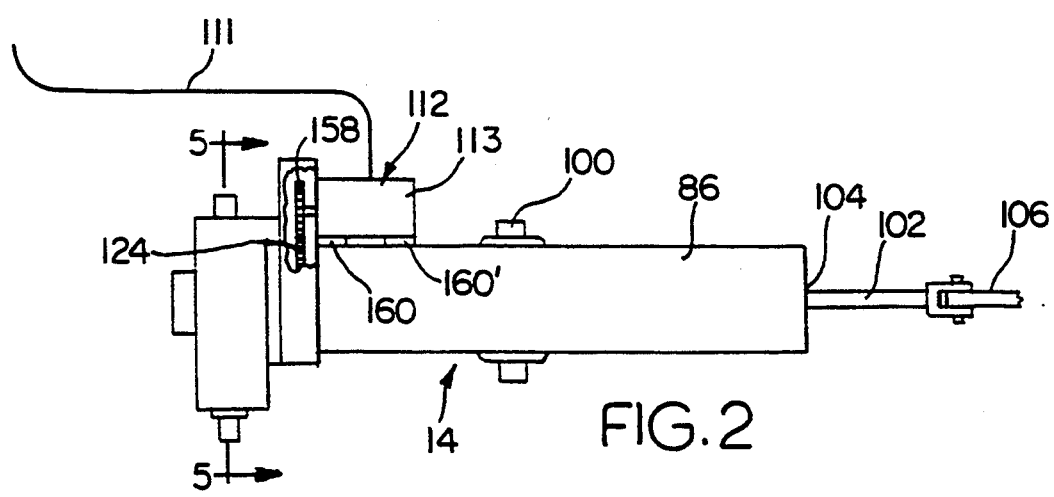
FIG. 2 is a schematic illustration of a ball screw actuator as illustrated in FIG. 1.
Figure 3:
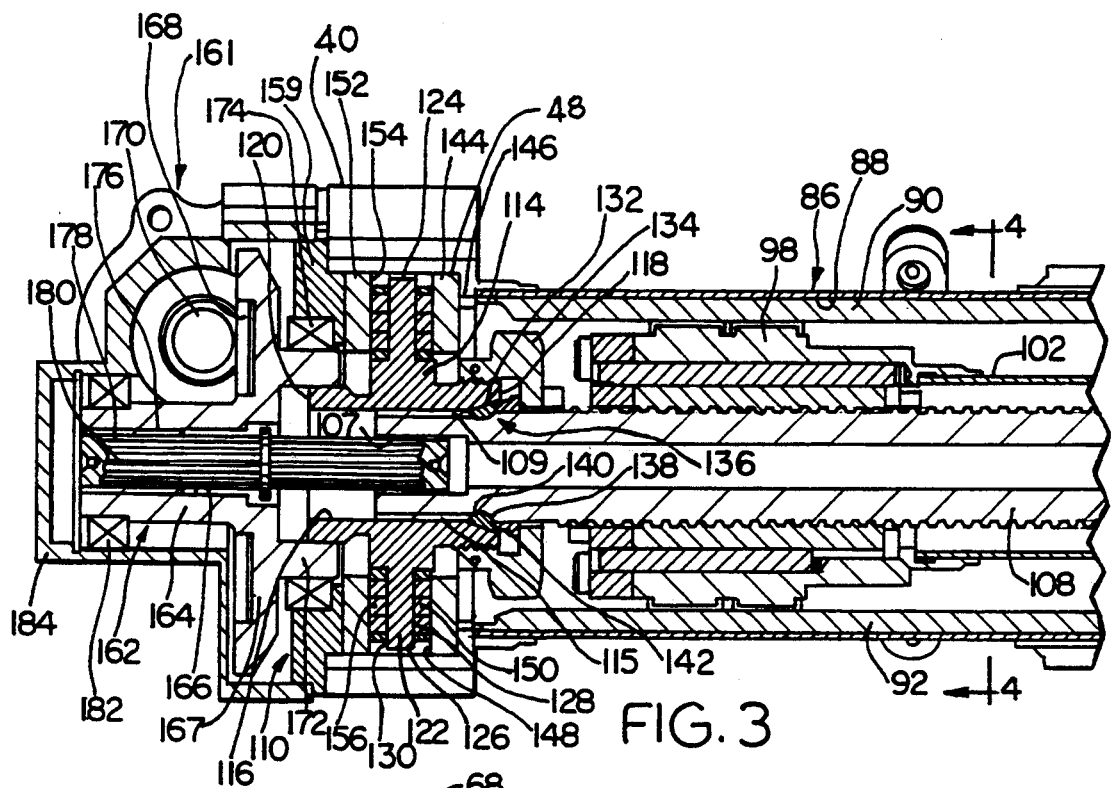
FIG. 3 is an enlarged sectional view of a portion of a ball screw actuator of FIG. 2 illustrating the thrust bearing assembly.
Figure 5:
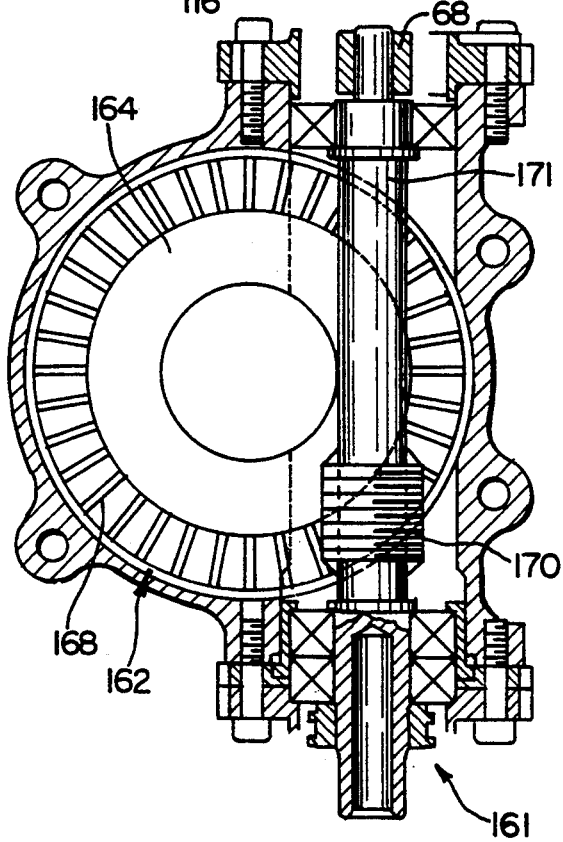
FIG. 5 is a sectional view taken along line 5—5 of FIG. 2 showing the pinion and drive gear for the ball screw actuator.
Figure 4:
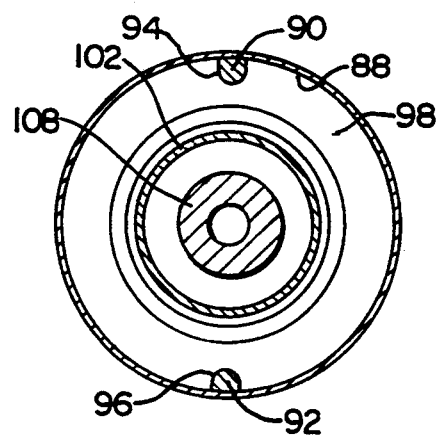
FIG. 4 is a sectional view taken along line 4—4 of FIG. 3.

The rotative input from cables 64 and 66 is communicated to each ball screw 108 through a pinion gear coupling 161 that includes a worm gear 170 and gear 162 as best shown in FIGS. 2, 3 and 5. Gear 162 has a hub 164 with an axial bore 166 therein. Hub 164 has a radial disc 167 extending therefrom on which drive teeth 168 are located. Drive teeth 168 are engaged with teeth on worm gear 170 connected to drive end 68 of cable 64. The radial disc has an axial annular flange 172 that extends therefrom which engages roller bearing 174 retained by locating plate 159 attached to housing 40. The axial bore 166 of hub 164 has a splined surface 176 which is mated with a corresponding splined surface 178 on shaft 180. Splined surface 178 is also splined to surface 107 to connect hub 164 to ball screw 108. A roller bearing 182 retained in an end member 184 engages hub 164 and with roller bearing 174 maintains shaft 180 in axial alignment of ball screw 108 within bore 88. Further, the axial annular flange 172 engages the second end 120 of cylindrical body 114 to assist in maintaining gear teeth 124 on peripheral surface 126 in engagement with the spur gear 158 of sensor 112.

MODE OF OPERATION OF THE PREFERRED EMBODIMENT

An operational signal from cpu 62 is communicated to the mechanical servo assembly 18 to activate actuators 14,14' and 14" Activation of the mechanical servo assembly determines the direction of flow of pressurized air to the four way valve 22. With the flow of pressurized air to the motor elements in airmotor 12 a rotational torque is created and carried by cables 64 and 66 to the actuators 14,14' and 14" The rotative torque on cables 64 and 66 is relatively high speed but is converted by gear coupling 161 into a relatively slower speed with more torque for rotating the ball screws 108 in actuators 14,14' and 14". Rotation of ball screws 108 causes ball nuts 98,98' and 98" (only ball nut 98 being actually shown) to move linearly as slots 94 and 96 slide on rails 90 and 92. As ball screw 108 rotates, each cylindrical body 114 also rotates such that gear teeth 124 provides gear 158 in sensors 112,112' and 112" with information relating to such movement. Movement of the gear 158 as perceived by each sensors 112,112' and 112" is provided as a direct feedback on lines 111,111' and 111" to the cpu 62 which corresponds to the movement of the output members 102,102' and 102" and is directly calibrated to provide an indication of the position of the convergent nozzle.

We claim:

1. In a control system having an actuator with a ball screw supported in a bore of a housing by a thrust bearing assembly, said ball screw translating rotary movement from a drive coupling into linear movement of a ball nut to provide an output member with linear movement, said thrust bearing assembly comprising:
   a cylindrical body with an axial bore that extends from a first end and a second end, said cylindrical body having an annular radial projection with gear teeth on a peripheral surface and first and second inner race surfaces thereon adjacent said first and second ends, respectively;
   fastener means for connecting said first end of said cylindrical body to said ball screw;
   a first roller bearing located on said cylindrical body and positioned to engage said first inner race surface;
   a first plate located in said housing and having a first outer race surface thereon;
   a second roller bearing located on said cylindrical body and positioned to engage said second inner race surface;
   a second plate located in said housing and having a second outer race surface thereon; and
   a locating plate attached said housing and engaging said second plate for urging said first and second roller bearings into engagement with said first and second inner and outer race surfaces to fix the axial position of said cylindrical body in said housing, said gear teeth on said peripheral surface of said cylindrical body being rotated with said ball screw to provide a sensor device with a signal corresponding to the location of said output member with respect to said housing.

2. The control system as recited in claim 1 wherein said fastener means includes:
   an end nut; and
   a washer member located on said ball screw, said washer having a tapered surface thereon, said end nut being fastened onto said first end to move said tapered surface into engagement with a corresponding surface extending from said first end of said cylindrical member toward said axial bore to develop frictional clamping therebetween and thereby fixing the cylindrical body to said ball screw.

3. The control system as recited in claim 2 wherein said fastener means includes;
   a first splined surface on said cylindrical body in said bore adjacent said first end; and
   a second splined surface on said ball screw, said first and second splined surfaces engaging each other to form a positive drive joint between said cylindrical body and said ball screw.

4. The control system as recited in claim 3 wherein said drive coupling includes;
   a gear having a hub with a second axial bore therein, said hub having a radial disc extending therefrom, said radial disc having an axial annular flange extending therefrom, said radial disc having drive teeth thereon which engage a direct drive worm gear from a power source;
   a shaft for connecting said hub to said ball screw;
   a third bearing retained in a end member and engaging said hub;
   a fourth bearing connected to said locating plate and engaging said axial annular flange, said third and fourth bearings maintaining said shaft in axial alignment with said ball screw and maintaining a desired radial and axial position for said gear with respect to said ball screw.

5. The control system as recited in claim 4 wherein said axial annular flange on said radial disc engages said second end of said cylindrical body to assist in maintaining said gear teeth on said peripheral surface in engagement with said sensor device.

6. The control system as recited in claim 5 wherein said sensor device includes:
   a gear directly connected to said gear teeth on said annular radial projection of said cylindrical body for providing a rotational torque to a position sensor device connected to an indicator.

7. The control system as recited in claim 6 further including:
   spacer means located between said housing for said actuator and said sensor means to establish a desired engagement relation between the teeth on said peripheral surface and the teeth on said gear.

* * * * *